(12) United States Patent
Schaude

(10) Patent No.: US 10,565,094 B1
(45) Date of Patent: Feb. 18, 2020

(54) INCREASING DATA ACCESSIBILITY ACROSS SYSTEM ARCHITECTURE ENVIRONMENTS

(71) Applicant: SAP SE, Walldorf (DE)

(72) Inventor: Horst F. Schaude, Kraichtal (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/183,553

(22) Filed: Nov. 7, 2018

(51) Int. Cl.
  *G06F 11/36* (2006.01)
  *G06F 16/22* (2019.01)

(52) U.S. Cl.
  CPC ......... *G06F 11/3664* (2013.01); *G06F 11/36* (2013.01); *G06F 11/3688* (2013.01); *G06F 16/2282* (2019.01)

(58) Field of Classification Search
  CPC ... G06F 11/3664; G06F 11/3668; G06F 11/36
  See application file for complete search history.

(56) References Cited

U.S. PATENT DOCUMENTS

| | | | | |
|---|---|---|---|---|
| 8,972,990 B2* | 3/2015 | Ashok | ................. | G06F 9/45558 718/1 |
| 9,442,713 B2* | 9/2016 | Plax | .......................... | G06F 8/65 |
| 9,672,139 B2* | 6/2017 | Peng | .................... | G06F 11/3664 |
| 10,353,798 B1* | 7/2019 | Diac | ......................... | G06F 9/50 |
| 2014/0068600 A1* | 3/2014 | Ashok | ................. | G06F 9/45558 718/1 |
| 2016/0378449 A1* | 12/2016 | Khazanchi | ................ | G06F 8/71 717/120 |
| 2018/0121339 A1* | 5/2018 | Mayers | ............... | G06F 11/3688 |

OTHER PUBLICATIONS

Jebbar et al., "Poster: Re-Testing Configured Instances in the Production Environment—a Method for Reducing the Test Suite" (Year: 2019).*

* cited by examiner

*Primary Examiner* — Phillip H Nguyen
(74) *Attorney, Agent, or Firm* — Schwegman Lundberg & Woessner, P.A.

(57) ABSTRACT

Techniques for increasing accessibility of data across different environments of a computer system architecture are disclosed. In some example embodiments, a computer-implemented method comprises detecting that a production instance of a software solution has been created in a production environment of a cloud computing system, the production environment having a production namespace in which production objects of the production instance are stored, detecting that a development instance of the software solution has been created in a development environment of the cloud computing system, the development environment having a development namespace in which development objects of the development instance are stored, and copying the production objects from the production namespace of the production environment into the development namespace of the development environment based on the detecting that the production instance and the development instance have been created, with the copied production objects being stored in the development namespace.

20 Claims, 8 Drawing Sheets

US 10,565,094 B1

INCREASING DATA ACCESSIBILITY ACROSS SYSTEM ARCHITECTURE ENVIRONMENTS

TECHNICAL FIELD

The present application relates generally to the technical field of data transfer within an electrical computer system architecture, and, in various embodiments, to systems and methods for increasing accessibility of data across different environments of a computer system architecture.

BACKGROUND

In cloud computing system architectures, software solutions are often developed and tested in a separate system environment, such as a development environment, than the environment in which they are deployed for use by end users, such as a production environment. These different environments are typically isolated from one another. As a result of this environmental isolation, in order to test an instance of the software solution in the development environment, a user must use manually created test data rather than using real data created from use by one or more end users of the deployed instance of the software solution in the production environment. This technical problem of limited accessibility of data between different environments leads to another technical problem in the form of insufficient test data being readily available, thereby diminishing the efficiency and quality of the testing of the instance of the software solution. The present disclosure addresses these and other technical problems that plague the computer functionality of cloud computing system architectures.

BRIEF DESCRIPTION OF THE DRAWINGS

Some example embodiments of the present disclosure are illustrated by way of example and not limitation in the figures of the accompanying drawings, in which like reference numbers indicate similar elements.

DETAILED DESCRIPTION

Figure 1:
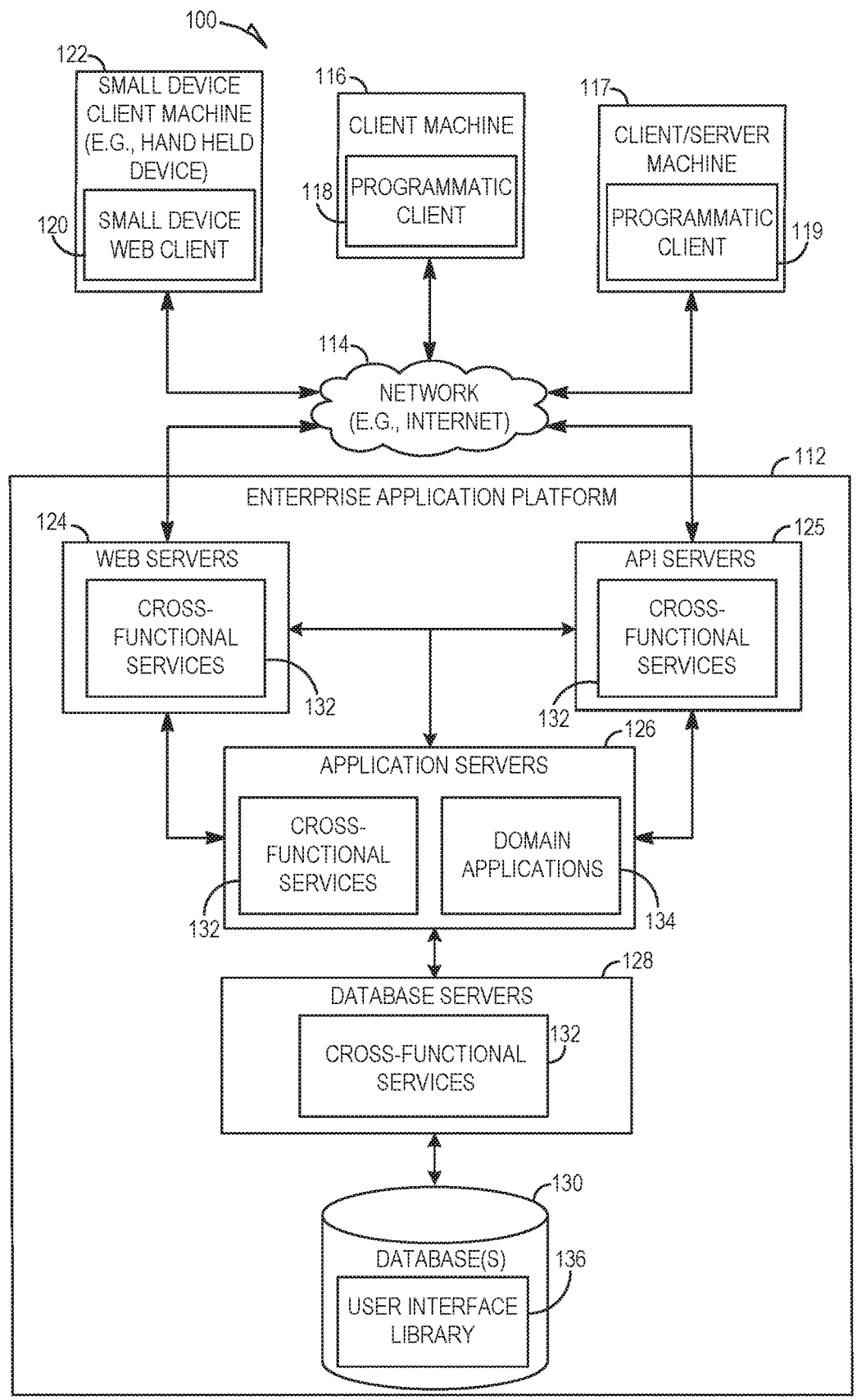
FIG. 1 is a network diagram illustrating a client-server system, in accordance with some example embodiments.

Example methods and systems for improving (e.g., increasing) accessibility of data across different environments of a computer system architecture are disclosed. In the following description, for purposes of explanation, numerous specific details are set forth in order to provide a thorough understanding of example embodiments. It will be evident, however, to one skilled in the art that the present embodiments can be practiced without these specific details.

In some example embodiments, a cloud computing system architecture is configured to provide a software development infrastructure configured to enhance a cloud solution of an end user by creating software solutions that contain all developed and enhanced artifacts. The software development infrastructure may provide an underlying cloud software solution to end users, and the end users may then customize the cloud software solution according to their specific criteria. One or more administrative users may develop and test the underlying cloud software solution within the development environment, and then deploy an instance of the cloud software solution to the production environment, where it can be customized and used by one or more end users. The customization and use of the instance of the cloud software solution deployed to the production environment may cause the generation of objects, such as artifacts. Although the production environment in which these objects are created is isolated from the development environment in which the underlying cloud software solution is created and updated, the present disclosure provides a system and method of making those objects accessible within the development environment in order to improve the quality and efficiency of the development and testing of the underlying cloud software solution.

One technical effect of the system and method of the present disclosure is to effectively and efficiently enable a user to use real data created from the use of a deployed instance of a software solution in a production environment by one or more end users when testing an instance of the software solution in the development environment. As a result, the efficiency and quality of the testing of the instance of the software solution is improved. Additionally, other technical effects that improve the functionality of computer systems will be apparent from this disclosure as well.

In some example embodiments, a computer-implemented method comprises: detecting that a production instance of a software solution has been created in a production environment of a cloud computing system architecture, the production environment making the production instance of the software solution accessible for use by a plurality of end users of the cloud computing system architecture and having a production namespace in which production objects of the production instance are stored, the production objects having been generated by use of the production instance of the software solution in the production environment; detecting that a development instance of the software solution has been created in a development environment of the cloud computing system architecture, the development environment restricting access to the development instance of the software solution to only one or more administrative users of the cloud computing system and having a development namespace in which development objects of the development instance are stored, the one or more administrative users being different than the plurality of end users; copying the production objects from the production namespace of the production environment into the development namespace of the development environment based on the detecting that the production instance has been created and the detecting that the development instance has been created, the copied production objects being stored in the development namespace; and testing the development instance of the software solution in the development environment using the copied production objects stored in the development namespace.

In some example embodiments, the cloud computing system architecture comprises a production tenant and a development tenant, the production environment isolating the production objects within the production tenant, and the development environment isolating the development objects within the development tenant.

In some example embodiments, the software solution comprises a multi-tiered software application, and the production objects comprise entities within the multi-tiered software application that work in conjunction with a data access layer and a domain logic layer to transport data across tiers of the multi-tiered software application.

In some example embodiments, the production objects comprise a set of data for at least one automated workflow.

In some example embodiments, the development instance of the software solution comprises a software patch, and the detecting that the development instance of the software solution has been created is performed subsequent to the detecting that the production instance of the software solution has been created.

In some example embodiments, the production namespace comprises a prefix for one or more database tables in which the production objects of the production instance are stored, and the development namespace comprises a prefix for one or more database tables in which the development objects of the development instance are stored.

In some example embodiments, the copying the productions objects from the production namespace into the development namespace is triggered by the creation of the development instance.

In some example embodiments, the copying the productions objects from the production namespace into the development namespace comprises: accessing a metadata repository; identifying all persistency database tables for the production instance of the software solution based on the accessing the metadata repository; and for each one of the identified persistency database tables for the production instance: identifying a prefix representing the production namespace for the one of the identified persistency database tables; identifying a corresponding name of the one of the identified persistency database tables for the production instance using the identified prefix representing the production namespace; and copying all of the production objects in the one of the identified persistency database tables into another persistency database table using a prefix representing the development namespace for the other persistency database table and using the identified corresponding name of the one of the identified persistency database tables as a corresponding name of the other persistency database table.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is a network diagram illustrating a client-server system 100, in accordance with some example embodiments. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the example enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The cross-functional services 132 can include relational database modules to provide support services for access to the database(s) 130, which includes a user interface library 136. The web servers 124, API servers 125, application servers 126, and database servers 128 can host cross-functional services 132. The application servers 126 can further host domain applications 134.

The cross-functional services 132 provide services to users and processes that utilize the enterprise application platform 112. For instance, the cross-functional services 132 can provide portal services (e.g., web services), database services and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. Further, while the system 100 shown in FIG. 1 employs a client-server architecture, the embodiments of the present disclosure are of course not limited to such an architecture, and could equally well find application in a distributed, or peer-to-peer, architecture system.

The enterprise application platform 112 can improve (e.g., increase) accessibility of data across different environments of a computer system architecture. For example, the enterprise application platform 112 can effectively and efficiently enable a user to use real data created from use by one or more end users of a deployed instance of a software solution in a production environment when testing an instance of the software solution in the development environment. The enterprise application platform 112 is described in greater detail below in conjunction with FIGS. 2-7.

Figure 2:
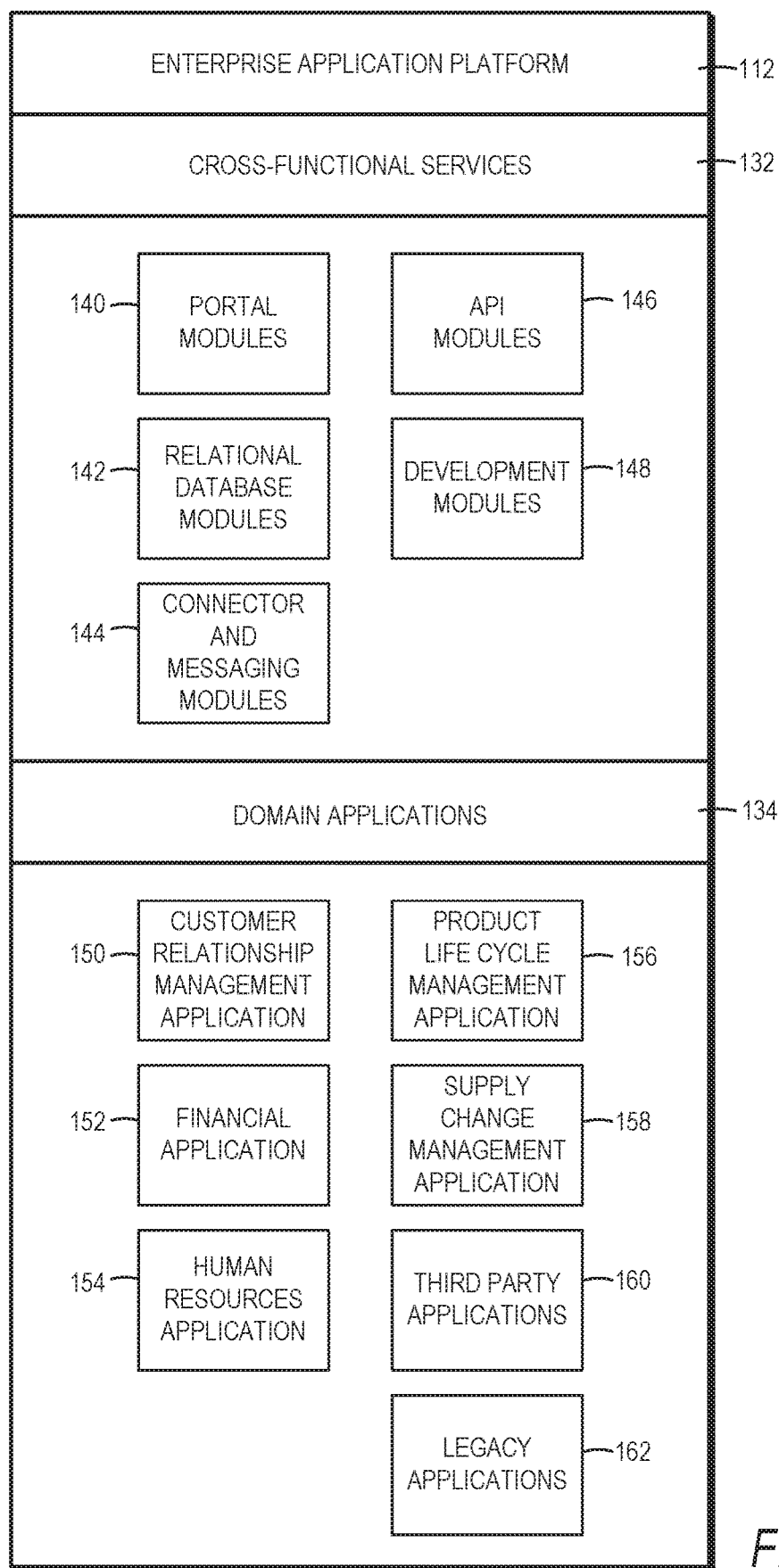
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, relational database modules 142, connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services, and exchange information with other users and within a defined scope. For example, the role can determine the content that is available to the user and the activities that the user can perform. The portal modules 140 include a generation module, a communication module, a receiving module and a regenerating module. In addition, the portal modules 140 can comply with web services standards and/or utilize a variety of Internet technologies including Java, J2EE, SAP's Advanced Business Application Programming Language (ABAP) and Web Dynpro, XML, JCA, JAAS, X.509, LDAP, WSDL, WSRR, SOAP, UDDI and Microsoft .NET.

The relational database modules 142 can provide support services for access to the database(s) 130, which includes a user interface library 136. The relational database modules 142 can provide support for object relational mapping, database independence, and distributed computing. The relational database modules 142 can be utilized to add, delete, update and manage database elements. In addition, the relational database modules 142 can comply with database standards and/or utilize a variety of database technologies including SQL, SQLDBC, Oracle, MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating, and extension of software components on the enterprise application platform 112 without impacting existing cross-functional services 132 and domain applications 134.

Turning to the domain applications 134, the customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize the financial applications 152 and business processes to track and control financial transactions within the enterprise application platform 112. The financial applications 152 can facilitate the execution of operational, analytical, and collaborative tasks that are associated with financial management. Specifically, the financial applications 152 can enable the performance of tasks related to financial accountability, planning, forecasting, and managing the cost of finance.

The human resource applications 154 can be utilized by enterprise personnel and business processes to manage, deploy, and track enterprise personnel. Specifically, the human resource applications 154 can enable the analysis of human resource issues and facilitate human resource decisions based on real-time information.

The product life cycle management applications 156 can enable the management of a product throughout the life cycle of the product. For example, the product life cycle management applications 156 can enable collaborative engineering, custom product development, project management, asset management, and quality management among business partners.

The supply chain management applications 158 can enable monitoring of performances that are observed in supply chains. The supply chain management applications 158 can facilitate adherence to production plans and on-time delivery of products and services.

The third-party applications 160, as well as legacy applications 162, can be integrated with domain applications 134 and utilize cross-functional services 132 on the enterprise application platform 112.

Figure 3:
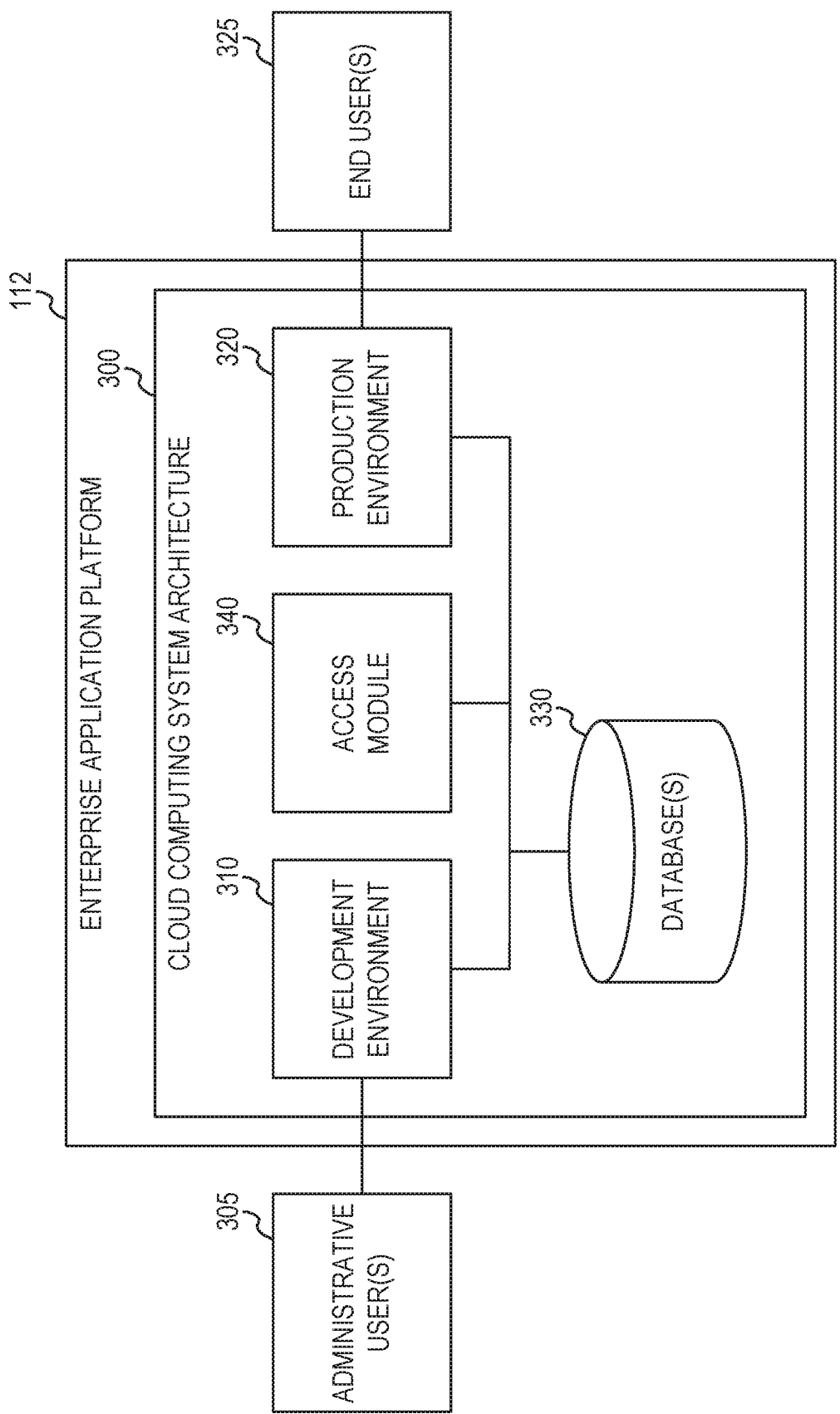
FIG. 3 is a block diagram illustrating a cloud computing system architecture in which accessibility of data across different environments is increased, in accordance with some example embodiments.

FIG. 3 is a block diagram illustrating a cloud computing system architecture 300 in which accessibility of data across different environments is increased, in accordance with some example embodiments. In some example embodiments, the cloud computing system architecture 300 is implemented by the enterprise application platform 112. However, the cloud computing system architecture 300 may be implemented in other ways as well.

In some example embodiments, the cloud computing system architecture 300 comprises any combination of one or more of a development environment 310, a production environment 320, one or more databases 330, and an access module 340. In some example embodiments, the cloud computing system architecture 300 resides on one or more machines each having a memory and at least one processor (not shown). In some example embodiments, the components of the cloud computing system architecture 300 reside on the same machine, while in other example embodiments, some of the different components of the cloud computing system architecture 300 reside on separate remote machines that communicate with each other via a network (e.g., network 114 in FIG. 1). In some example embodiments, the cloud computing system architecture 300 is incorporated into the enterprise application platform 112 in FIG. 1 (e.g., on application server(s) 126). However, it is contemplated that other configurations are also within the scope of the present disclosure.

Although the example embodiment shown in FIG. 3 only shows two types of environments, the development environment 310 and the production environment 320, other types of software environments are also within the scope of the present disclosure. In some example embodiments, the cloud computing system architecture 300 implements software development, testing, and deployment using a phased approach, such as Development, Testing, Acceptance, and Production (DTAP). In a DTAP phased approach, a computer program or software component, such as a software solution, is developed on a development environment. Once the software developer thinks the software solution is ready, the software solution is copied to a testing environment to verify that it works as expected. This testing environment may be standardized and in close alignment with the target environment. If the test is successful, then the software solution is copied to an acceptance test environment, in which the customer tests the software solution in this acceptance test environment to verify whether it meets their expectations. If the customer accepts the software solution, then the software solution is deployed to a production environment, making it available to all users of the system.

An environment or tier is a computer system in which a computer program or software component, such as a software solution, is deployed and executed. In the example embodiment shown in FIG. 3, the development environment 310 is configured to implement both a development phase and a testing phase for a software solution. In some example embodiments, the development environment 310 shown in FIG. 3 also represents a testing environment separate and distinct from the development environment. Accordingly, the development environment 310 shown in FIG. 3 may comprise a single environment in which a software solution may be both developed and tested or two separate environments, one environment for developing the software solution and another environment for testing the software solution.

In some example embodiments, the cloud computing system architecture 300 comprises a production tenant and a development tenant, and the production environment 320 isolates production objects within the production tenant, while the development environment 310 isolates development objects within the development tenant. In some example embodiments, the cloud computing system architecture 300 comprises a multi-tenancy architecture. Multi-tenancy refers to a software architecture in which a single instance of software runs on a server and serves multiple tenants. A tenant is a group of users who share a common access with specific privileges to the software instance. With a multi-tenancy architecture, a software application is designed to provide every tenant a dedicated share of the instance, including its data, configuration, user management, tenant individual functionality, and non-functional properties. In some example embodiments, the cloud computing system architecture 300 comprises a multi-instance architecture in which separate software instances operate on behalf of different tenants.

In some example embodiments, the production objects and the development objects comprise entities within a multi-tiered software application that works in conjunction with data access and domain logic layers to transport data. One example of such an object is a business object. However, other types of objects are also within the scope of the present disclosure.

In some example embodiments, a data access layer comprises a layer of a computer program that provides simplified access to data stored in persistent storage, such as in an entity-relational database. For example, the data access layer may return a reference to an object complete with its attributes instead of a row of fields from a database table, thereby allowing the client (or user) modules to be created with a higher level of abstraction. This kind of model may be implemented by creating a class of data access methods that directly reference a corresponding set of database stored procedures. Another implementation may retrieve or write records to or from a file system. The data access layer may hide this complexity of the underlying data store from the external world.

In some example embodiments, the domain logic comprises the part of the program that encodes the real-world rules (e.g., business rules) that determine how data can be created, stored, and changed. It is contrasted with the remainder of the software that is concerned with lower-level details of managing a database or displaying the user interface, system infrastructure, or generally connecting various parts of the program. In some example embodiments, the domain logic prescribes how objects (e.g., business objects) interact with one another, and enforces the routes and the methods by which objects are accessed and updated. In some example embodiments, the real-world rules model real-life objects (e.g., accounts, loans, itineraries, and inventories), and the domain logic comprises workflows that are the ordered tasks of passing documents or data from one participant (e.g., a person or a software system) to another.

The domain logic is distinguished from the real-world rules. The domain logic is the portion of an enterprise system that determines how data is transformed or calculated, and how it is routed to people or software (e.g., workflow), while the real-world rules are formal expressions of organization policy. Anything that is a process or procedure is domain logic, and anything that is neither a process nor a procedure is a real-world rule.

In some example embodiments, the production objects and the development objects comprise artifacts. An artifact is one of many kinds of tangible by-products produced during the development of software. Some artifacts (e.g., use cases, class diagrams, and other Unified Modeling Language (UML) models, requirements, and design documents) help describe the function, architecture, and design of software. Other artifacts are concerned with the process of development itself, such as project plans, business cases, and risk assessments. In some example embodiments, artifacts are associated with specific development methods or processes (e.g., Unified Process). In some example embodiments involving end-user development, the artifact comprises either an application or a complex data object that is created by an end-user without the need to know a general programming language. In some example embodiments, the artifact describes automated behavior or control sequences, such as database requests or grammar rules, or user-generated content.

In some example embodiments, the development environment 310 restricts access to a development instance of the software solution to only one or more administrative users 305 of the cloud computing system architecture 300, while the production environment 320 makes a production instance of the software solution accessible for use by one or more end users 325 of the cloud computing system architecture 300. In some example embodiments, the administrative users 305 are different than the end users 325. In some example embodiments, a software solution comprises a computer program or software application that has been custom-built or configured to solve a specific problem. The software solution may be created out of several products or built on a software platform. In some example embodiments, development objects or other data of the development instance of the software solution are stored in the database(s) 330. Similarly, in some example embodiments, production objects or other data of the production instance of the software solution are stored in the database(s) 330.

In some example embodiments, the access module 340 is configured to detect that a production instance of a software solution has been created in the production environment 320 of the cloud computing system architecture 300, where the production instance of the software solution is accessible for use by the end users 325 of the cloud computing system architecture 300. In some example embodiments, the production objects are generated by use of the production instance of the software solution in the production environment 320, and the production environment 320 has a production namespace in which the production objects of the production instance are stored.

In some example embodiments, the access module 340 is configured to detect that a development instance of the software solution has been created in the development environment 310 of the cloud computing system architecture 300, where access to the development instance of the software solution is restricted to only one or more administrative users 305 of the cloud computing system architecture 300. In some example embodiments, the development objects are generated by use of the development instance of the software solution in the development environment 310, and the development environment 310 has a development namespace in which development objects of the development instance are stored.

In some example embodiments, an object is stored in a namespace using a name of the object, and the name in the namespace comprises a namespace name and a local name. The namespace name may be applied as a prefix to the local name. In one example using augmented Backus-Naur form:
  name=<namespace identifier> separator <local name>.
In some example embodiments, the production namespace comprises a prefix for one or more database tables in which the production objects of the production instance are stored, and the development namespace comprises a prefix for one or more database tables in which the development objects of the development instance are stored.

Figure 4:
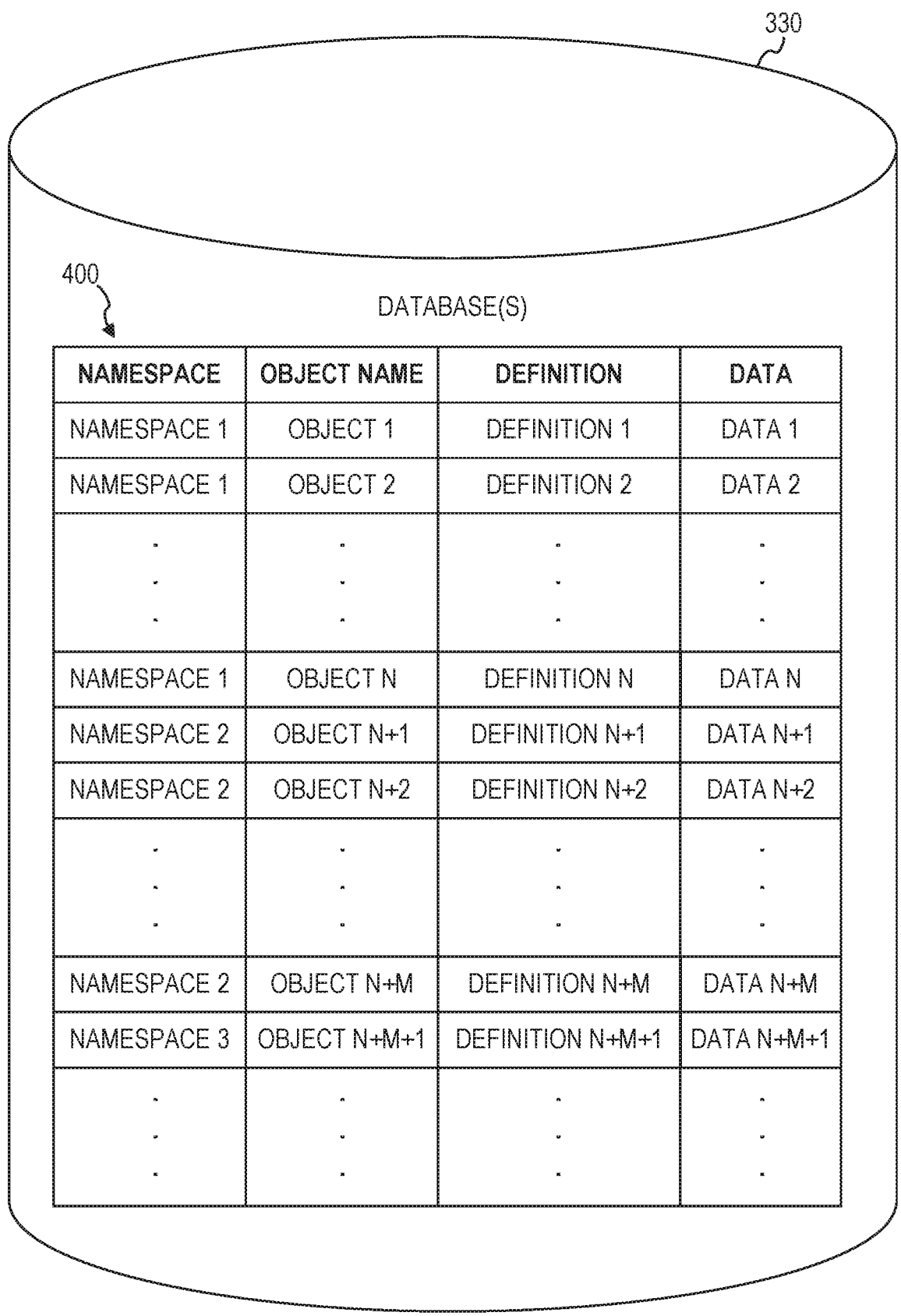
FIG. 4 illustrates a table of objects of an instance of a software solution, in accordance with some example embodiments.

FIG. 4 illustrates a table 400 of objects of an instance of a software solution, in accordance with some example embodiments. In some example embodiments, the table 400 is stored in the database(s) 330. A software solution may comprise a plurality of objects, with each object comprising an object name, a definition, and additional data. This object data for the software solution may be stored in a corresponding namespace of the particular instance of the software solution at issue. For example, in FIG. 4, N objects (OBJECT 1, OBJECT 2, . . . , OBJECT N) for a particular instance of a software solution are stored along with their corresponding definitions (DEFINITION 1, DEFINITION 2, . . . , DEFINITION N) and other corresponding data (DATA 1, DATA 2, . . . , DATA N) in a particular namespace (NAMESPACE 1) for that particular instance of the software solution, while M objects (OBJECT N+1, OBJECT N+2, . . . , OBJECT N+M) for another particular instance of the software solution are stored along with their corresponding definitions (DEFINITION N+1, DEFINITION N+2, . . . , DEFINITION N+M) and other corresponding data (DATA N+1, DATA N+2, . . . , DATA N+M) in another particular namespace (NAMESPACE 2) for that other particular instance of the software solution, and so on and so forth. In some example embodiments, the different namespaces correspond to different environments. For example, a development namespace may be used for the development environment 310 in which a development instance of the software solution is used, while a production namespace may be used for a production environment 320 in which a production instance of the software solution is used.

Although the example in FIG. 4 shows one table 400 storing objects of different namespaces, in some example embodiments, objects of different namespaces are stored in different tables 400. For example, development objects of a development namespace may be stored in a different table than production objects of a production namespace.

In some example embodiments, the access module 340 is configured to copy the production objects from the production namespace of the production environment 320 into the development namespace of the development environment 310 based on the detection of the production instance being created and the detection of the development instance being created. The copied production objects are stored in the development namespace of the development environment 310.

Figure 5A:
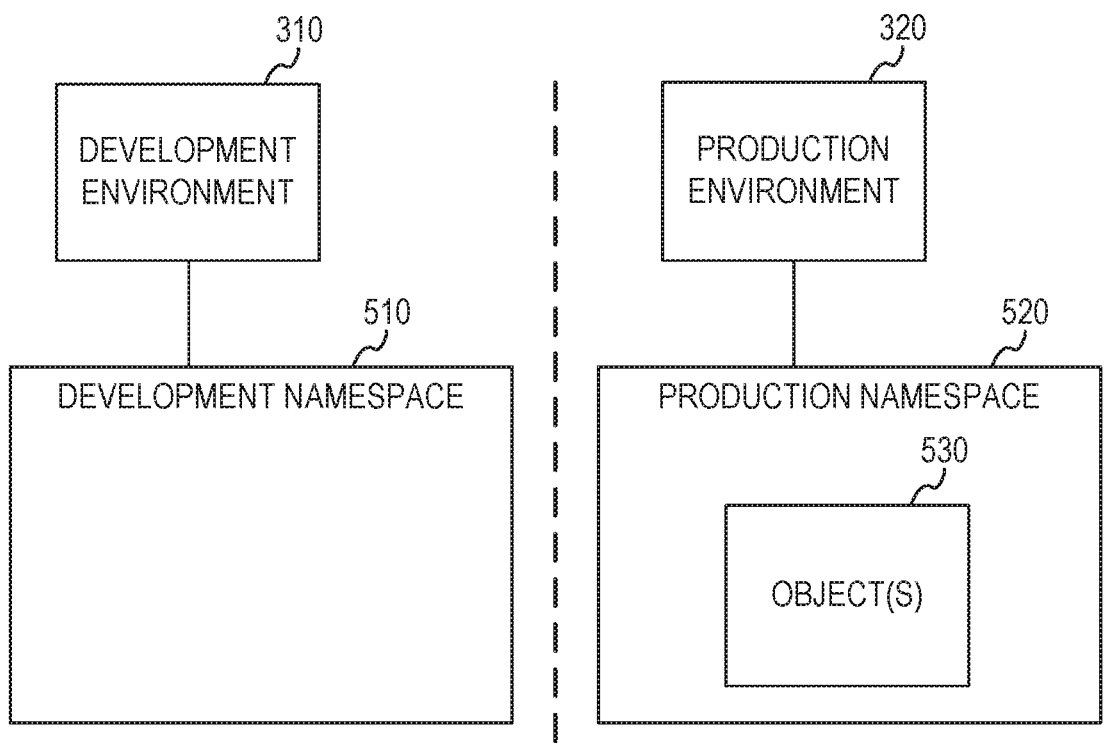
FIGS. 5A-5B illustrate one or more objects of a production instance of a software solution stored in a production namespace of a production environment being copied into a development namespace of a development environment, in accordance with some example embodiments.
Figure 5B:
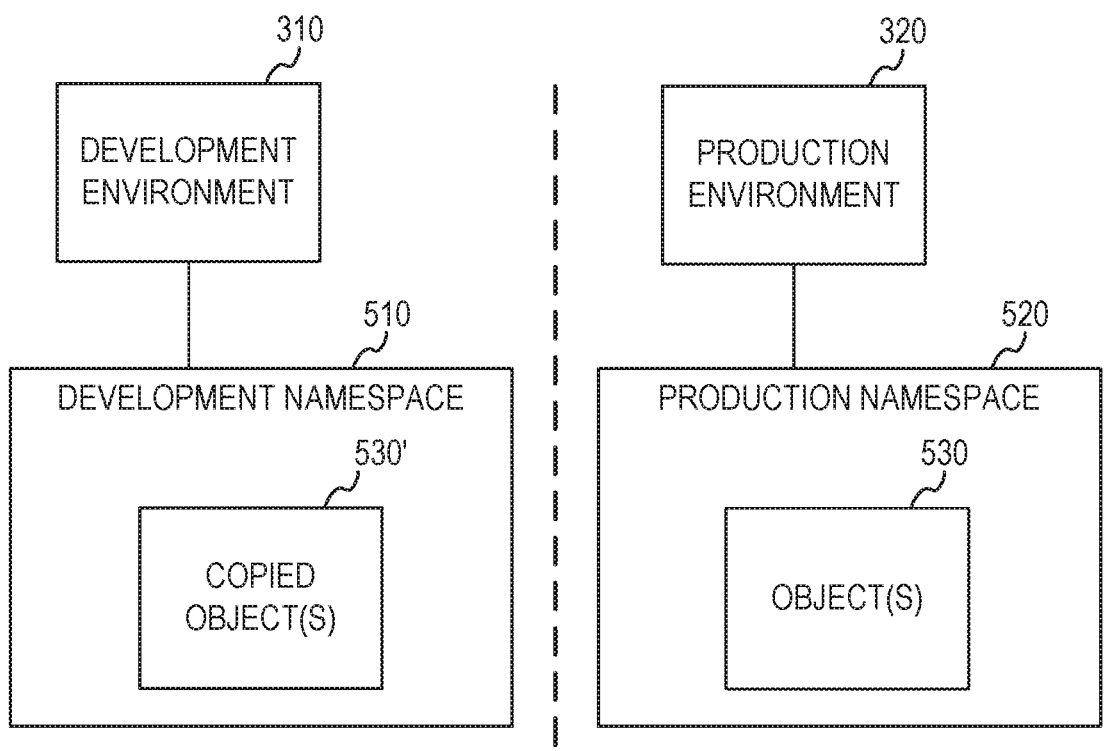

FIGS. 5A-5B illustrate one or more objects 530 of a production instance of a software solution stored in a production namespace 520 of the production environment 320 being copied into a development namespace 510 of the development environment 310, in accordance with some example embodiments. In FIG. 5A, one or more objects 530 of the production instance of the software solution have been created within the production environment 320, and the object(s) 530 are stored within the production namespace 520 of the production environment 320, such as within the table 400 in FIG. 4 using the production namespace 520 as the namespace for the object(s) 530. In FIG. 5B, the access module 340 has copied the object(s) 530 of the production instance of the software solution from the production namespace 520 of the production environment 320, and has stored the copied object(s) 530' of the production instance within the development namespace 510 of the development environment 310.

In some example embodiments, the access module 340 is configured to copy the objects 530 from the production namespace 520 into the development namespace 510 in response to the creation of the development instance within the development environment 310. In this example embodiment, the creation of the development instance of the software solution triggers the copying of the objects 530 from the production namespace 520 into the development namespace 510. Although a development instance of the software solution is typically created in the development environment 310 before a production instance of the software solution is created in the production environment 320, one or more subsequent development instances of the software solution may be created in the development environment 310 subsequent to the production instance of the software solution being created in the production environment 320. For example, in some example embodiments, one such subsequent development instance of the software solution comprises a software patch, such as a patch to fix or otherwise update a computer program. The access module 340 may detect the creation of the software patch of the software solution in the development environment 310 subsequent to the creation, or the detection of the creation, of the production instance of the software solution in the production environment 320.

In some example embodiments, the access module 340 is configured to copy the productions objects from the production namespace 520 into the development namespace 510 by performing an algorithm. In some example embodiments, the algorithm comprises accessing a metadata repository, and identifying all persistency database tables for the production instance of the software solution based on the accessing of the metadata repository. In some example embodiments, the algorithm further comprises, for each one of the identified persistency database tables for the production instance, identifying a prefix representing the production namespace 520 for the one of the identified persistency database tables, identifying a corresponding name of the one of the identified persistency database tables for the production instance using the identified prefix representing the production namespace 520, and copying all of the production objects in the one of the identified persistency database tables into another persistency database table using a prefix representing the development namespace 510 for the other persistency database table and using the identified corresponding name of the one of the identified persistency database tables as a corresponding name of the other persistency database table.

In some example embodiments, the algorithm comprises determining all persistency database tables via access to the metadata repository. In some example embodiments, the algorithm further comprises, for every database table found, replacing the prefix from the source namespace (e.g., the production namespace) with the target namespace (e.g., the development namespace) to determine the source database table name and the target database table name, reading line-by-line from the source database table, moving the content by name to the target database structure, and updating the target database table. In some example embodiments, as the metadata object definition and, therefore, the database table can only be enhanced with new elements and columns, the data may be moved from a very old source version with only a few elements and columns to a new target version with many elements and columns. The new columns may simply be empty. In some example embodiments, if there is an existence check on the name of the column in advance, the access module 240 may reverse the copy direction and copy from a development solution to a test solution. It is contemplated that other copying algorithms are also within the scope of the present disclosure.

Referring back to FIG. 3, in some example embodiments, the development environment 310 is configured to test the development instance of the software solution in the development environment 310 using the copied production objects stored in the development namespace.

Figure 6:
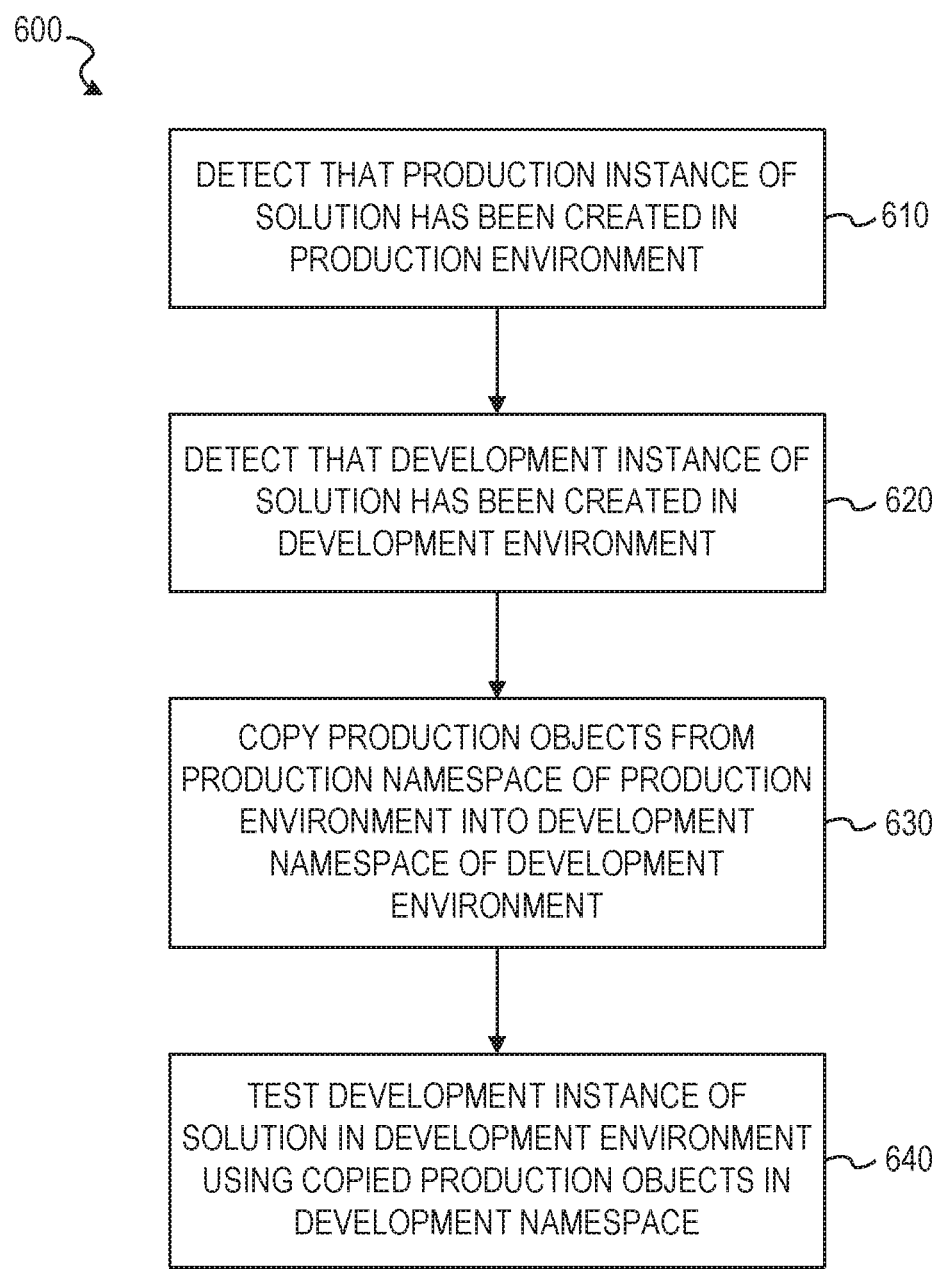
FIG. 6 illustrates a flowchart illustrating a method of increasing accessibility of data across different environments of a computer system architecture, in accordance with some example embodiments.

FIG. 6 illustrates a flowchart illustrating a method 600 of increasing accessibility of data across different environments of a computer system architecture, in accordance with some example embodiments. Method 600 can be performed by processing logic that can comprise hardware (e.g., circuitry, dedicated logic, programmable logic, microcode, etc.), software (e.g., instructions run on a processing device), or a combination thereof. In one example embodiment, the method 600 is performed by the access module 340 of FIG. 3, as described above.

At operation 610, the access module 340 detects that a production instance of a software solution has been created in a production environment of a cloud computing system architecture 300. In some example embodiments, the production environment makes the production instance of the software solution accessible for use by a plurality of end users of the cloud computing system architecture. In some example embodiments, the production environment has a production namespace in which production objects of the production instance are stored. In some example embodiments, the production objects have been generated by use of the production instance of the software solution in the production environment.

At operation 620, the access module 340 detects that a development instance of the software solution has been created in a development environment of the cloud computing system architecture 300. In some example embodiments, the development environment restricts access to the development instance of the software solution to only one or more administrative users of the cloud computing system, and the one or more administrative users are different than the plurality of end users. In some example embodiments, the development environment has a development namespace in which development objects of the development instance are stored.

In some example embodiments, the cloud computing system architecture 300 comprises a production tenant and a development tenant, and the production environment isolates the production objects within the production tenant, while the development environment isolates the development objects within the development tenant. In some example embodiments, the software solution comprises a multi-tiered software application, and the production objects comprise entities within the multi-tiered software application that work in conjunction with a data access layer and a domain logic layer to transport data across tiers of the multi-tiered software application. In some example embodiments, the production objects comprise a set of data for at least one automated workflow.

In some example embodiments, the development instance of the software solution comprises a software patch, and the detecting that the development instance of the software solution has been created at operation 620 is performed subsequent to the detecting that the production instance of the software solution has been created at operation 610. However, other configurations are also within the scope of the present disclosure.

In some example embodiments, the production namespace comprises a prefix for one or more database tables in which the production objects of the production instance are stored, and the development namespace comprises a prefix for one or more database tables in which the development objects of the development instance are store. However, other configurations of the production namespace and the development namespace are also within the scope of the present disclosure.

At operation 630, the access module 340 copies the production objects from the production namespace of the production environment into the development namespace of the development environment based on the detecting that the production instance has been created, at operation 610, and the detecting that the development instance has been created, at operation 620. In some example embodiments, the copied production objects are stored in the development namespace. In some example embodiments, the copying the productions objects from the production namespace into the development namespace is triggered by the creation of the development instance or by the detecting of the creation of the development instance at operation 620. In some example embodiments, the creation of the development instance comprises a creation of a patch for another development instance of the software solution.

At operation 640, the access module 340 tests the development instance of the software solution in the development environment using the copied production objects stored in the development namespace. In some example embodiments, the testing of the development instance at operation 640 is triggered, or otherwise based on, an instruction received by the access module 340 from an administrative user.

It is contemplated that any of the other features described within the present disclosure can be incorporated into method 600.

Figure 7:
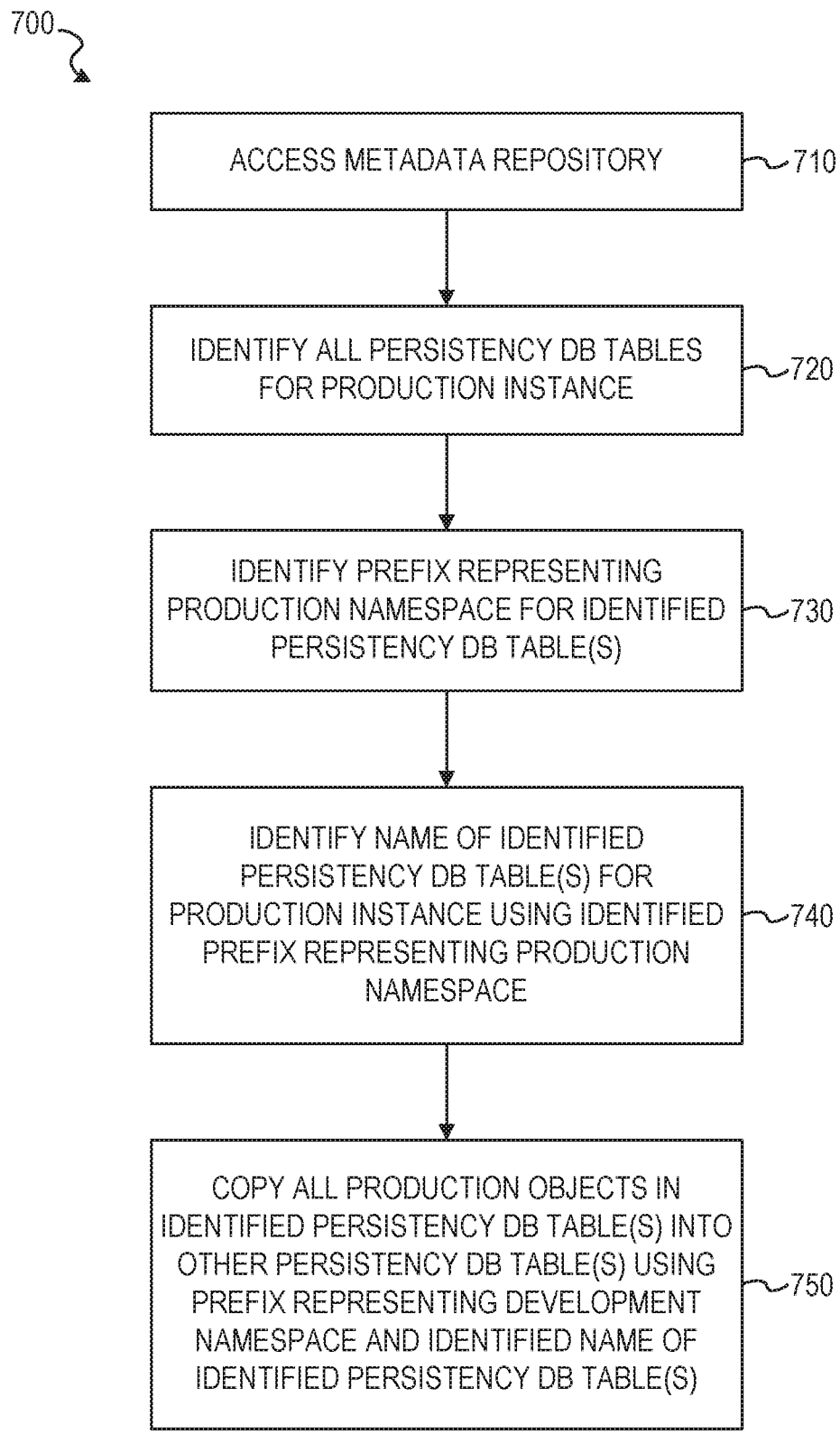
FIG. 7 is a flowchart illustrating a method of copying production objects from a production namespace of a production environment into a development namespace of a development environment, in accordance with some example embodiments.

FIG. 7 is a flowchart illustrating a method 700 of copying production objects from a production namespace of a production environment into a development namespace of a development environment, in accordance with some example embodiments. Method 700 can be performed by processing logic that can comprise hardware (e.g., circuitry, dedicated logic, programmable logic, microcode, etc.), software (e.g., instructions run on a processing device), or a combination thereof. In one example embodiment, the method 700 is performed by the access module 340 of FIG. 3, as described above.

At operation 710, the access module 340 accesses a metadata repository. In some example embodiments, the metadata repository comprises one or more databases storing metadata for data of the software solution. At operation 720, the access module 340 identifies all persistency database tables for the production instance of the software solution based on the accessing of the metadata repository at operation 710. At operation 730, the access module 340, for each one of the identified persistency database tables for the production instance, identifies a prefix representing the production namespace for the one of the identified persistency database tables. At operation 740, the access module 340, for each one of the identified persistency database tables for the production instance, identifies a corresponding name of the one of the identified persistency database tables for the production instance using the identified prefix representing the production namespace. At operation 750, the access module 340, for each one of the identified persistency database tables for the production instance, copies all of the production objects in the one of the identified persistency database tables into another persistency database table using a prefix representing the development namespace for the other persistency database table and using the identified corresponding name of the one of the identified persistency database tables as a corresponding name of the other persistency database table.

It is contemplated that any of the other features described within the present disclosure can be incorporated into method 700.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 8:
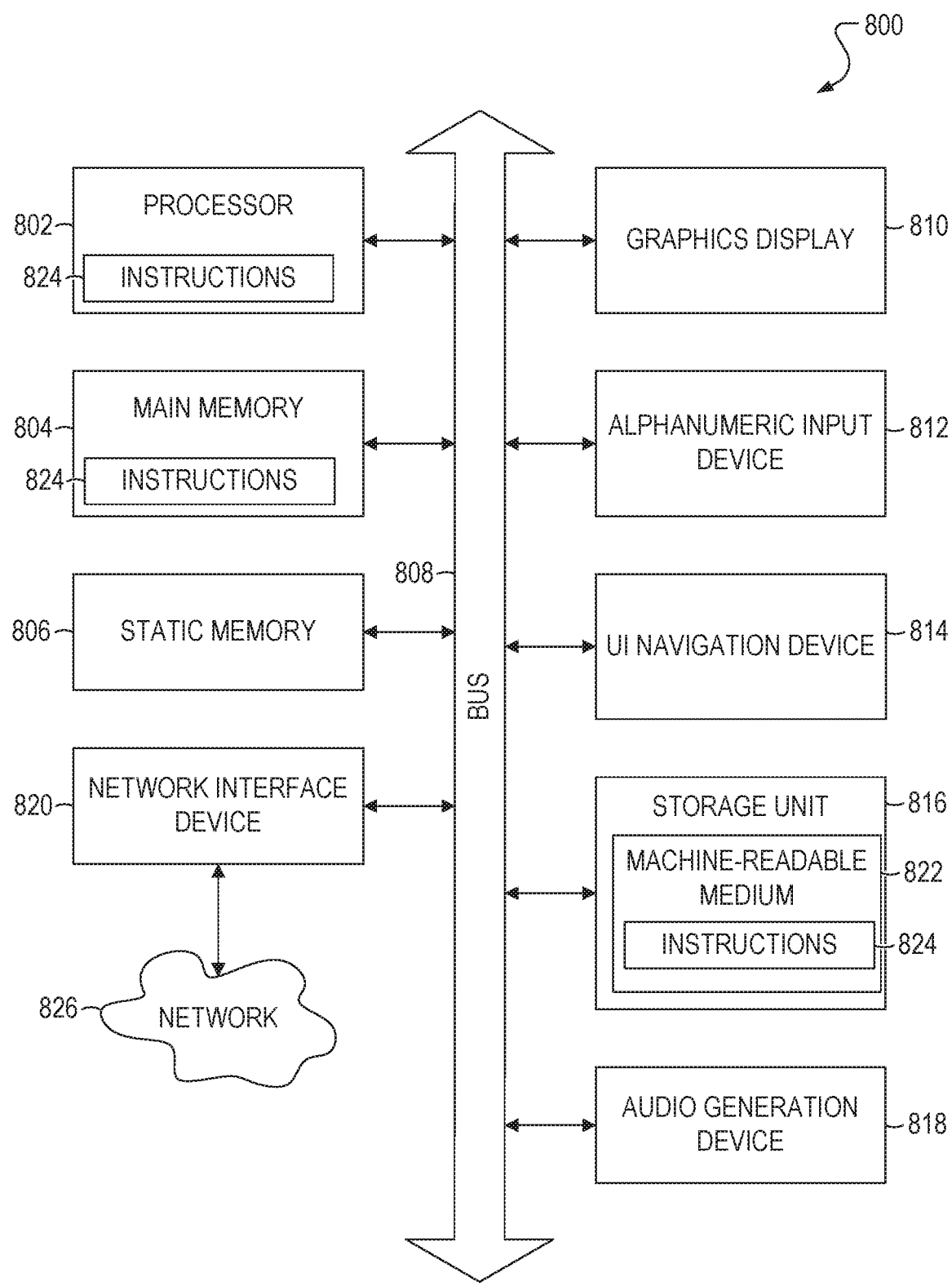
FIG. 8 is a block diagram of an example computer system on which methodologies described herein can be executed, in accordance with some example embodiments.

FIG. 8 is a block diagram of a machine in the example form of a computer system 800 within which instructions 824 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804, and a static memory 806, which communicate with each other via a bus 808. The computer system 800 may further include a graphics or video display unit 810 (e.g., a liquid crystal display (LCD) or a cathode ray tube (CRT)). The computer system 800 also includes an alphanumeric input device 812 (e.g., a keyboard), a user interface (UI) navigation (or cursor control) device 814 (e.g., a mouse), a storage unit (e.g., a disk drive unit) 816, an audio or signal generation device 818 (e.g., a speaker), and a network interface device 820.

The storage unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media. The instructions 824 may also reside, completely or at least partially, within the static memory 806.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

The following numbered examples are embodiments.

1. A computer-implemented method comprising:
   detecting, by at least one hardware processor, that a production instance of a software solution has been created in a production environment of a cloud computing system architecture, the production environment making the production instance of the software solution accessible for use by a plurality of end users of the cloud computing system architecture and having a production namespace in which production objects of the production instance are stored, the production objects having been generated by use of the production instance of the software solution in the production environment;
   detecting, by the at least one hardware processor, that a development instance of the software solution has been created in a development environment of the cloud computing system architecture, the development environment restricting access to the development instance of the software solution to only one or more administrative users of the cloud computing system and having a development namespace in which development objects of the development instance are stored, the one or more administrative users being different than the plurality of end users;

copying, by the at least one hardware processor, the production objects from the production namespace of the production environment into the development namespace of the development environment based on the detecting that the production instance has been created and the detecting that the development instance has been created, the copied production objects being stored in the development namespace; and testing, by the at least one hardware processor, the development instance of the software solution in the development environment using the copied production objects stored in the development namespace.

2. The computer-implemented method of example 1, wherein the cloud computing system architecture comprises a production tenant and a development tenant, the production environment isolating the production objects within the production tenant, and the development environment isolating the development objects within the development tenant.

3. The computer-implemented method of example 1 or example 2, wherein the software solution comprises a multi-tiered software application, and the production objects comprise entities within the multi-tiered software application that work in conjunction with a data access layer and a domain logic layer to transport data across tiers of the multi-tiered software application.

4. The computer-implemented method of any one of examples 1 to 3, wherein the production objects comprise a set of data for at least one automated workflow.

5. The computer-implemented method of any one of examples 1 to 4, wherein the development instance of the software solution comprises a software patch, and the detecting that the development instance of the software solution has been created is performed subsequent to the detecting that the production instance of the software solution has been created.

6. The computer-implemented method of any one of examples 1 to 5, wherein the production namespace comprises a prefix for one or more database tables in which the production objects of the production instance are stored, and the development namespace comprises a prefix for one or more database tables in which the development objects of the development instance are stored.

7. The computer-implemented method of any one of examples 1 to 6, wherein the copying the production objects from the production namespace into the development namespace is triggered by the creation of the development instance.

8. The computer-implemented method of any one of examples 1 to 7, wherein the copying the production objects from the production namespace into the development namespace comprises:
accessing a metadata repository;
identifying all persistency database tables for the production instance of the software solution based on the accessing the metadata repository; and
for each one of the identified persistency database tables for the production instance:
identifying a prefix representing the production namespace for the one of the identified persistency database tables;
identifying a corresponding name of the one of the identified persistency database tables for the production instance using the identified prefix representing the production namespace; and
copying all of the production objects in the one of the identified persistency database tables into another persistency database table using a prefix representing the development namespace for the other persistency database table and using the identified corresponding name of the one of the identified persistency database tables as a corresponding name of the other persistency database table.

9. A system comprising:
at least one processor, and
a non-transitory computer-readable medium storing executable instructions that, when executed, cause the at least one processor to perform the method of any one of examples 1 to 8.

10. A non-transitory machine-readable storage medium, tangibly embodying a set of instructions that, when executed by at least one processor, causes the at least one processor to perform the method of any one of examples 1 to 8.

11. A machine-readable medium carrying a set of instructions that, when executed by at least one processor, causes the at least one processor to carry out the method of any one of examples 1 to 8.

Each of the features and teachings disclosed herein can be utilized separately or in conjunction with other features and teachings to provide a system and method for increasing accessibility of data across different environments of a computer system architecture. Representative examples utilizing many of these additional features and teachings, both separately and in combination, are described in further detail with reference to the attached figures. This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The example methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the method steps disclosed herein. The structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to aid in understanding how the present teachings are practiced, but not intended to limit the dimensions and the shapes shown in the examples.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented comprising:
    detecting, by at least one hardware processor, that a production instance of a software solution has been created in a production environment of a cloud computing system architecture, the production environment making the production instance of the software solution accessible for use by end users of the cloud computing system architecture and having a production namespace in which production objects of the production instance are stored, the production objects generated by use of the production instance of the software solution in the production environment;
    detecting, by the at least one hardware processor, that a development instance of the software solution has been created in a development environment of the cloud computing system architecture, the development environment restricting access to the development instance of the software solution to only one or more administrative users of the cloud computing system and having a development namespace in which development objects of the development instance are stored, the one or more administrative users being different than the end users;
    copying, by the at least one hardware processor, the production objects from the production namespace of the production environment into the development namespace of the development environment based on the detecting that the production instance has been created and the detecting that the development instance has been created, the copied production objects being stored in the development namespace; and
    testing, by the at least one hardware processor, the development instance of the software solution in the development environment using the copied production objects stored in the development namespace.

2. The computer-implemented method of claim 1, wherein the cloud computing system architecture comprises a production tenant and a development tenant, the production environment isolating the production objects within the production tenant, and the development environment isolating the development objects within the development tenant.

3. The computer-implemented method of claim 1, wherein the software solution comprises a multi-tiered software application, and the production objects comprise entities within the multi-tiered software application that work in conjunction with a data access layer and a domain logic layer to transport data across tiers of the multi-tiered software application.

4. The computer-implemented method of claim 1, wherein the production objects comprise a set of data for at least one automated workflow.

5. The computer-implemented method of claim 1, wherein the development instance of the software solution comprises a software patch, and the detecting that the development instance of the software solution has been created is performed subsequent to the detecting that the production instance of the software solution has been created.

6. The computer-implemented method of claim 1, wherein the production namespace comprises a prefix for one or more database tables in which the production objects of the production instance are stored, and the development namespace comprises a prefix for one or more database tables in which the development objects of the development instance are stored.

7. The computer-implemented method of claim 1, wherein the copying the productions objects from the production namespace into the development namespace is triggered by the creation of the development instance.

8. The computer-implemented method of claim 1, wherein the copying the productions objects from the production namespace into the development namespace comprises:
  accessing a metadata repository;
  identifying all persistency database tables for the production instance of the software solution based on the accessing the metadata repository; and
  for each one of the identified persistency database tables for the production instance:
    identifying a prefix representing the production namespace for the one of the identified persistency database tables;
    identifying a corresponding name of the one of the identified persistency database tables for the production instance using the identified prefix representing the production namespace; and
    copying all of the production objects in the one of the identified persistency database tables into another persistency database table using a prefix representing the development namespace for the other persistency database table and using the identified corresponding name of the one of the identified persistency database tables as a corresponding name of the other persistency database table.

9. A system comprising:
  at least one processor; and
  a non-transitory computer-readable medium storing executable instructions that, when executed, cause the at least one processor to perform operations comprising:
    detecting that a production instance of a software solution has been created in a production environment of a cloud computing system architecture, the production environment making the production instance of the software solution accessible for use by a plurality of end users of the cloud computing system architecture and having a production namespace in which production objects of the production instance are stored, the production objects having been generated by use of the production instance of the software solution in the production environment;
    detecting that a development instance of the software solution has been created in a development environment of the cloud computing system architecture, the development environment restricting access to the development instance of the software solution to only one or more administrative users of the cloud computing system and having a development namespace in which development objects of the development instance are stored, the one or more administrative users being different than the plurality of end users;
    copying the production objects from the production namespace of the production environment into the development namespace of the development environment based on the detecting that the production instance has been created and the detecting that the development instance has been created, the copied production objects being stored in the development namespace; and
    testing the development instance of the software solution in the development environment using the copied production objects stored in the development namespace.

10. The system of claim 9, wherein the cloud computing system architecture comprises a production tenant and a development tenant, the production environment isolating the production objects within the production tenant, and the development environment isolating the development objects within the development tenant.

11. The system of claim 9, wherein the software solution comprises a multi-tiered software application, and the production objects comprise entities within the multi-tiered software application that work in conjunction with a data access layer and a domain logic layer to transport data across tiers of the multi-tiered software application.

12. The system of claim 9, wherein the production objects comprise a set of data for at least one automated workflow.

13. The system of claim 9, wherein the development instance of the software solution comprises a software patch, and the detecting that the development instance of the software solution has been created is performed subsequent to the detecting that the production instance of the software solution has been created.

14. The system of claim 9, wherein the production namespace comprises a prefix for one or more database tables in which the production objects of the production instance are stored, and the development namespace comprises a prefix for one or more database tables in which the development objects of the development instance are stored.

15. The system of claim 9, wherein the copying the productions objects from the production namespace into the development namespace is triggered by the creation of the development instance.

16. The system of claim 9, wherein the copying the productions objects from the production namespace into the development namespace comprises:

accessing a metadata repository;

identifying all persistency database tables for the production instance of the software solution based on the accessing the metadata repository; and for each one of the identified persistency database tables for the production instance:

identifying a prefix representing the production namespace for the one of the identified persistency database tables;

identifying a corresponding name of the one of the identified persistency database tables for the production instance using the identified prefix representing the production namespace; and copying all of the production objects in the one of the identified persistency database tables into another persistency database table using a prefix representing the development namespace for the other persistency database table and using the identified corresponding name of the one of the identified persistency database tables as a corresponding name of the other persistency database table.

17. A non-transitory machine-readable storage medium, tangibly embodying a set of instructions that, when executed by at least one processor, causes the at least one processor to perform operations comprising:

detecting that a production instance of a software solution has been created in a production environment of a cloud computing system architecture, the production environment making the production instance of the software solution accessible for use by a plurality of end users of the cloud computing system architecture and having a production namespace in which production objects of the production instance are stored, the production objects having been generated by use of the production instance of the software solution in the production environment;

detecting that a development instance of the software solution has been created in a development environment of the cloud computing system architecture, the development environment restricting access to the development instance of the software solution to only one or more administrative users of the cloud computing system and having a development namespace in which development objects of the development instance are stored, the one or more administrative users being different than the plurality of end users;

copying the production objects from the production namespace of the production environment into the development namespace of the development environment based on the detecting that the production instance has been created and the detecting that the development instance has been created, the copied production objects being stored in the development namespace; and testing the development instance of the software solution in the development environment using the copied production objects stored in the development namespace.

18. The non-transitory machine-readable storage medium of claim 17, wherein the cloud computing system architecture comprises a production tenant and a development tenant, the production environment isolating the production objects within the production tenant, and the development environment isolating the development objects within the development tenant.

19. The non-transitory machine-readable storage medium of claim 17, wherein the software solution comprises a multi-tiered software application, and the production objects comprise entities within the multi-tiered software application that work in conjunction with a data access layer and a domain logic layer to transport data across tiers of the multi-tiered software application.

20. The non-transitory machine-readable storage medium of claim 17, wherein the production objects comprise a set of data for at least one automated workflow.

\* \* \* \* \*